United States Patent
Lömker et al.

(10) Patent No.: US 11,641,793 B2
(45) Date of Patent: May 9, 2023

(54) MOWING MACHINE COMPRISING A CUTTERBAR WITH A PIVOTABLE LATERAL SECTION

(71) Applicant: Maschinenfabrik Bernard Krone GmbH & Co. KG, Spelle (DE)

(72) Inventors: Jens Lömker, Hopsten (DE); Hendrik Grothe, Meppen (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 478 days.

(21) Appl. No.: 16/851,138

(22) Filed: Apr. 17, 2020

(65) Prior Publication Data

US 2020/0329640 A1    Oct. 22, 2020

(30) Foreign Application Priority Data

Apr. 18, 2019  (DE) .................... 10 2019 002 828.7

(51) Int. Cl.
*A01D 34/66* (2006.01)
*A01D 34/76* (2006.01)
(Continued)

(52) U.S. Cl.
CPC ........... *A01D 34/664* (2013.01); *A01D 34/66* (2013.01); *A01D 34/76* (2013.01); *A01D 67/00* (2013.01); *F16H 1/20* (2013.01); *A01D 2101/00* (2013.01)

(58) Field of Classification Search
CPC ................... A01B 73/00; A01B 73/06–067; A01D 67/00; A01D 2101/00; A01D 34/66;
(Continued)

(56) References Cited

U.S. PATENT DOCUMENTS 5,179,822 A * 1/1993 McLean ................. A01D 34/76
                                                              56/14.7
8,028,505 B1 * 10/2011 Roberge ............... A01D 43/107
                                                              56/13.5
(Continued)

FOREIGN PATENT DOCUMENTS

DE         20006509 U1 * 10/2000  ............. A01B 73/00
DE         101 57 289        6/2003
(Continued)

*Primary Examiner* — Adam J Behrens

(74) *Attorney, Agent, or Firm* — Gudrun E. Huckett

(57) ABSTRACT

A mowing machine has a cutterbar oriented transverse to a travel and working direction of the mowing machine and provided with first and second ends spaced apart from each other in longitudinal direction. First cutting members are rotatably mounted on a top side of the cutterbar and rotatably driven about a vertical axis by a drive assembly within the cutterbar. A joint and drive assembly is connected to the first end of the cutterbar. A lateral cutterbar section is connected to the joint and drive assembly and has a second cutting member driven by the joint and drive assembly. The joint and drive assembly has first and second holding elements mounted relative to each other such that pivoting of the lateral cutterbar section in a cutterbar plane of the cutterbar is enabled. The first and second holding elements are arranged in planes positioned at a minimal spacing above each other.

15 Claims, 6 Drawing Sheets

(51) Int. Cl.
  *A01D 67/00* (2006.01)
  *F16H 1/20* (2006.01)
  *A01D 101/00* (2006.01)

(58) Field of Classification Search
  CPC ...... A01D 34/76; A01D 34/001; A01D 34/13; A01D 34/661; A01D 34/664; A01D 34/665; A01D 34/73; A01D 34/82
  See application file for complete search history.

(56) References Cited

U.S. PATENT DOCUMENTS

| | | |
|---|---|---|
| 2011/0078988 A1 | 4/2011 | Roberge |
| 2017/0251596 A1 * | 9/2017 | Stephenson ............ A01D 69/06 |

FOREIGN PATENT DOCUMENTS

| | | | | |
|---|---|---|---|---|
| DE | 10157289 A1 * | 6/2003 | ............. | A01B 73/02 |
| DE | 102005004212 A1 * | 8/2006 | ............ | A01B 73/067 |
| DE | 202015106396 U1 * | 1/2016 | ............ | A01B 73/046 |
| EP | 1932414 A1 * | 6/2008 | ............ | A01B 73/042 |
| EP | 3143861 B1 * | 8/2019 | ............ | A01D 34/661 |

* cited by examiner

MOWING MACHINE COMPRISING A CUTTERBAR WITH A PIVOTABLE LATERAL SECTION

BACKGROUND OF THE INVENTION

The invention relates to a mowing machine for mowing agricultural stem and leaf material. The mowing machine comprises cutting members attached to a cutterbar and rotatingly driven about an approximately vertical axis; the cutting members are rotatably supported at the top side of the cutterbar that is oriented in regard to its longitudinal extension transverse to the travel and working direction of the mowing machine and are rotatably driveable by a drive assembly accommodated within the cutterbar.

Such mowing machines are known in the prior art in various embodiments and are comprised in general of a cutterbar that is close to the ground in the working position and provided at its top side with cutting members that are rotatingly driven about approximately vertical axes. In their simplest embodiment, these mowing machines, which are generally referred to as disc mowers, are used for cutting stem crop wherein they can be coupled by front mount as well as rear mount to an agricultural traction and drive machine. For obtaining high output per unit area, today device combinations (triple mower combinations) are often used which are comprised of a mowing machine in front mount as well as two mowing machines in rear mount. Newer tendencies in regard to the configuration of mowing machines are based in this context on an enlargement of the working width for such device combinations. In order to be able to achieve this, it is in particular required to design the width dimensions of the mowing machine in front mount in such a way that a working width is made available for harvesting on the field that is above the dimensions which are set by law for the transport on roads.

DE 101 57 289 A1 discloses a mower with at least two coupled cutterbars which are connected to each other by means of a connecting joint. The connecting joint enables in this context a pivoting action of the outer cutterbar relative to the inwardly positioned cutterbar and, in the transport position, this is used to reduce the transport height minimally by positioning the two outer cutterbars in a roof shape relative to the inwardly positioned cutterbar. For supplying the respective cutterbars with drive energy, drive lines which extend between the support beams of the cutterbars are required; due to this configuration, a lack of functionality and ease of operation for the operator becomes apparent when pivoting of the cutterbars from the working position into an approximately vertical transport position. In this context, situations are also to be noted however in which the cutting tools of the cutting members of neighboring cutterbars may strike each other upon pivoting.

A further mowing machine is disclosed in US 2011/0078988.

It is the object of the present invention to propose a mowing machine that avoids the deficiencies of the prior art.

SUMMARY OF THE INVENTION

In accordance with the invention, this object is achieved in that the cutterbar, at least at one of its two ends that are spaced apart from each other in transverse direction relative to the travel and working direction, comprises a joint and drive assembly for holding an additional lateral cutterbar section and for driving the at least one cutting member attached to the additional lateral cutterbar section and in that the joint and drive assembly is comprised of two holding elements which are connected relative to each other such that a pivot movement of the additional lateral cutterbar section within the plane of the cutterbar of the mowing machine can be performed, wherein the holding elements of the joint and drive assembly are arranged in planes that are positioned at a minimal spacing one above the other.

Advantageous further embodiments of the invention result from the additional claims.

According to the invention, a mowing machine is proposed that is provided with a plurality of cutting members mounted on a cutterbar and rotatably driven about an approximately vertical axis, wherein the cutting members are rotatably supported at the top side of the cutterbar that extends with its longitudinal extension transverse to the travel and working direction of the mowing machine; the cutting members are driven in rotation by a drive assembly accommodated within the cutterbar. The cutterbar, at least at one of its two ends that are spaced apart from each other transverse to the travel and working direction, comprises a joint and drive assembly for holding an additional lateral cutterbar section and for driving the at least one cutting member attached to the additional lateral cutterbar section, and wherein the joint and drive assembly is comprised of two holding elements which are connected relative to each other such that a pivot movement of the additional lateral cutterbar section within the plane of the cutterbar of the mowing machine can be performed, wherein the holding elements of the joint and drive assembly are arranged in planes which are positioned at a minimal spacing one above the other.

With this configuration according to the invention, it is achieved that a cutterbar of a mowing machine is provided with an optimal enlargement of the working width by the addition of at least one additional lateral cutterbar section. This means that during work at least at one of the two ends of the cutterbar, extending with its longitudinal extension transverse to the travel and working direction, an additional lateral cutterbar section with at least one cutting member attached thereto is adjoined such that a continuously worked field or meadow strip is provided.

In an advantageous further embodiment, it can also be provided that at both ends of the cutterbar of the mowing machine an additional lateral cutterbar section is arranged.

For optional correlation of the at least one additional lateral cutterbar section at the end of the cutterbar of the mowing machine, a joint and drive assembly is provided according to the invention which is comprised of two holding elements which are pivotally connected to each other at their ends facing away from the cutterbar and facing away from the at least one additional lateral cutterbar section. Due to this pivot connection it is achieved that the at least one additional cutterbar section, which in the working position of the mowing machine is aligned with the cutterbar, can be pivoted into a transport position which in relation to the travel and working direction of the mowing machine is located approximately behind the outer cutting members of the cutterbar. The invention thus creates a mowing machine in which by a simple pivot movement of at least one additional cutterbar section within the plane of the cutterbar an enlargement of the working width in the working position as well as a reduction of the width dimensions of the mowing machine in the transport position can be realized. For example, it is possible in a simple way that the working width of the mowing machine in front mount is increased wherein then however at the same time the width dimensions of the mowing machine in the transport position can be maintained below the limit of 3 m set by law.

For connecting at least one additional lateral cutterbar section to the cutterbar of the mowing machine, a joint and drive assembly is provided which is comprised of two holding elements which, in the working position of the mowing machine, are pivotably connected to each other about an approximately vertically oriented pivot axis. These holding elements are furthermore configured such that within these holding elements components are mounted with which a rotary drive of the cutting members of the at least one additional lateral cutterbar section originating at the cutterbar is achieved. This means that in the pivotably changeable connecting region of the two holding elements a joint location is provided which can transmit a drive movement for the cutting members.

In a first advantageous embodiment, it can be provided that the holding element adjoining the end of the cutterbar forms a lower plane of the joint and drive assembly. The second holding element of the joint and drive assembly is then extending in an upper plane. Since the cutterbar and the at least one additional lateral cutterbar section in the working position must however be arranged in a common plane, it is necessary that one of the holding elements of the joint and drive assembly can compensate a height displacement. In this embodiment, this height displacement can be accommodated in the holding element which extends from the joint location to the at least one additional lateral cutterbar section. The spacing between the respective planes of the holding elements of the joint and drive assembly is designed for this purpose just so that the holding elements do not contact each other during the pivot movement of the holding elements relative to each other. This configuration advantageously entails a minimal construction height of the joint and drive assembly.

According to a further conceivable embodiment, the holding element of the joint and drive assembly which is facing the at least one additional lateral cutterbar section is arranged in a lower plane at the level of the at least one additional lateral cutterbar section. In the upper one of the two planes of the joint and drive assembly, the second holding element of the joint and drive assembly facing the cutterbar is then to be arranged with the height displacement.

For transmitting drive output from the cutting members of the cutterbar to the at least one cutting member of the at least one additional lateral cutterbar section, the holding elements of the joint and drive assembly are designed such that in the interior of the holding elements a plurality of spur gears are arranged which are engaging each other, are in engagement with the drive wheel of the outer cutting member of the cutterbar, and extend to the joint location of the joint and drive assembly. At this joint location of the joint and drive assembly, a spur gear shaft or a similar drive element is accommodated which compensates the height displacement between the two holding elements of the joint and drive assembly.

According to a further advantageous embodiment of the invention, this vertical spur gear shaft can also be designed such that the drive action of the cutting members of the cutterbar as well as the drive action of the cutting members of the at least one additional lateral cutterbar section is introduced at this spur gear shaft. The number of spur gears which are provided within the holding elements of the joint and drive assembly between the cutterbar and the joint location depends on whether the mowing machine is to be used only for cutting stem material or whether the mowing machine is to be used together with a processing unit that is provided for cutting and conditioning the stem material and that is arranged behind the cutting members. The use of a processing unit downstream of the cutting members of the cutterbar requires, of course, a greater construction distance when the at least one additional lateral cutterbar section is to be pivoted into the transport position behind the mowing members. Moreover, the selection of the number of the spur gears which are used in the holding elements serves to determine the rotation direction of the cutting members of the at least one additional lateral cutterbar section.

In a further advantageous embodiment of the invention, it can be provided that the pivoting action of the at least one additional cutterbar section between the working position and the transport position is introduced by an actuating device. For this purpose, various drive means such as a hydraulically or pneumatically driven actuator can be used.

BRIEF DESCRIPTION OF THE DRAWING

In the following, an advantageous embodiment of the invention will be explained with the aid of the drawing.

DESCRIPTION OF PREFERRED
EMBODIMENTS

Figure 1:
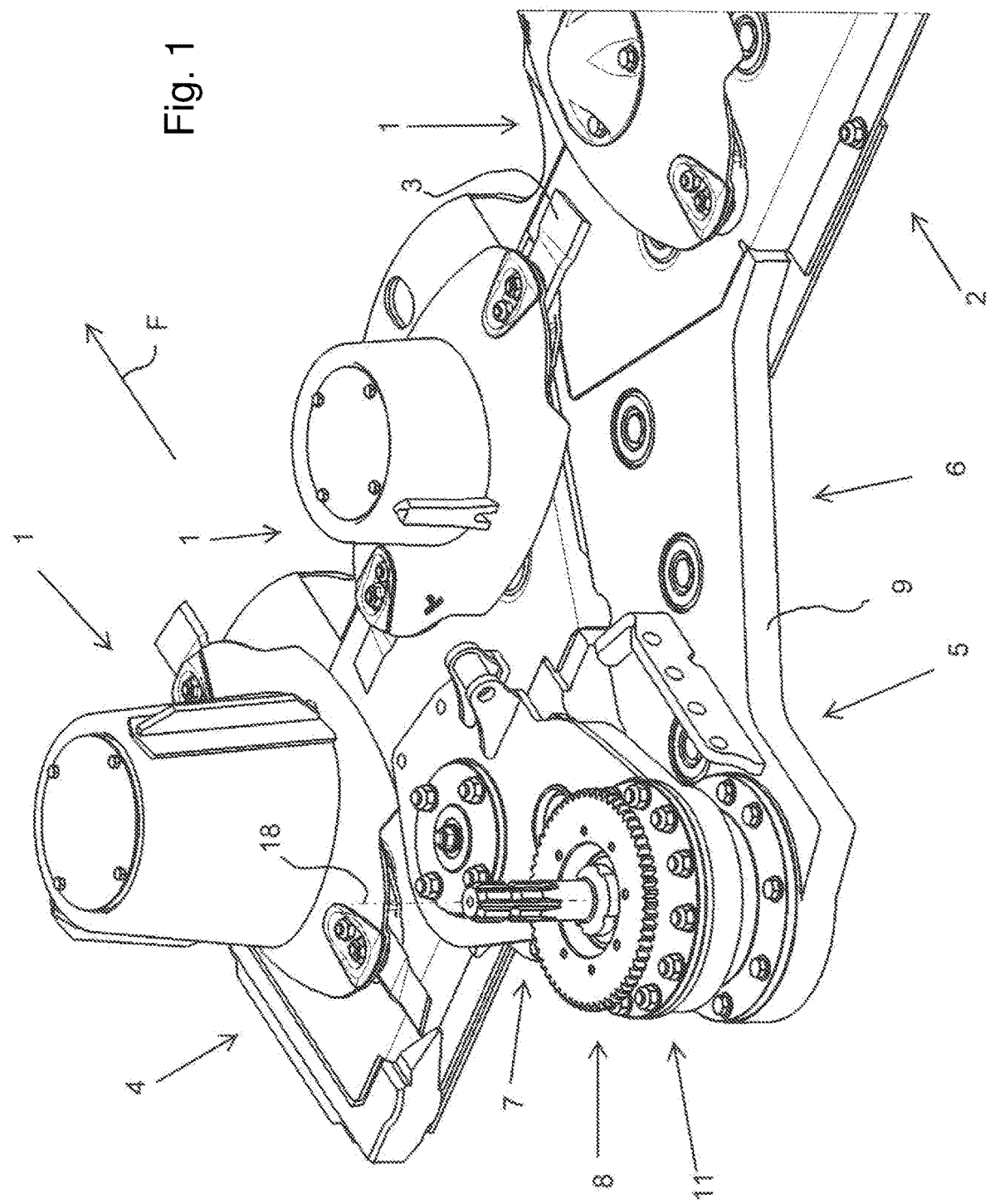
FIG. 1 shows a perspective illustration of a mowing machine according to the invention in the working position.
Figure 2:
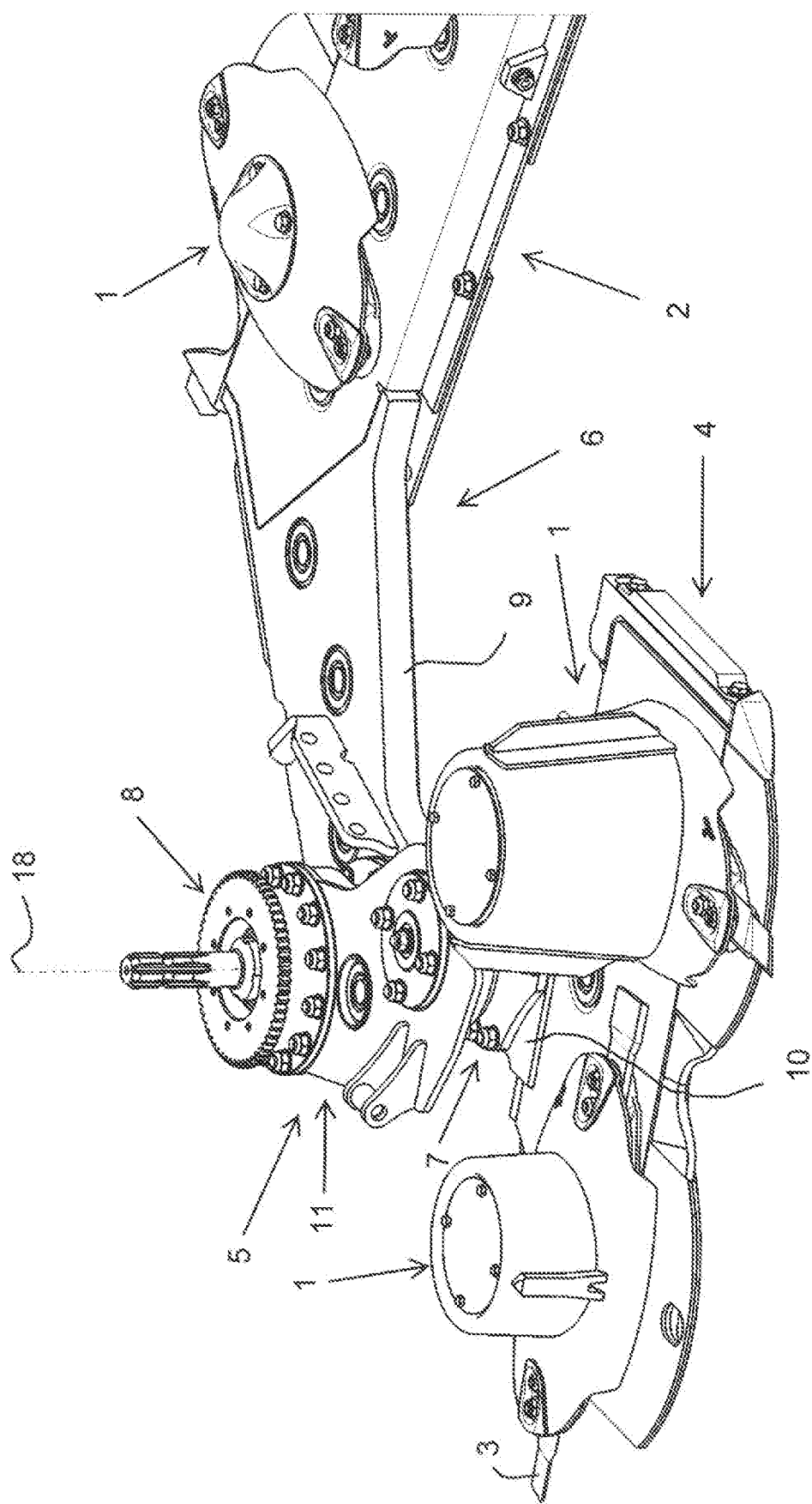
FIG. 2 shows a perspective illustration of the mowing machine according to FIG. 1 in the transport position.

A mowing machine according to the invention with a plurality of cutting members 1 that are arranged on the cutterbar 2 so as to be rotatingly driven about an approximately vertical axis and are used for mowing stem and leaf material close to the ground is illustrated in FIG. 1. At its outer periphery, the cutting members 1 are provided with at least two pivotably supported cutting blades 3 which upon circulation of the cutting members at high rotary speeds produce a cutting action in a free cut when the mowing machine is moved to glide across a field or meadow in the travel and working direction F. As can be seen furthermore in FIG. 1, the two outer cutting members 1 are mounted on at least one additional lateral cutterbar section 4 which is connected by means of a joint and drive assembly 5 to the lateral end of the cutterbar 2. Due to this attachment, the at least one additional cutterbar section 4 can be pivoted within a horizontal pivot plane out of the working position according to FIG. 1 into a transport position according to FIG. 2. In the working position, the cutterbar 2 with the at least one additional lateral cutterbar section 4 creates a continuous mowing device with which a strip-free and continuous mowing of agricultural stem and leaf material is possible. FIG. 2 shows that the at least one additional lateral cutterbar section 4 in its transport position is located behind the two outer cutting members 1 of the cutterbar 2 in relation to the travel and working direction F. With the mowing machine according to the invention, it is possible in an advantageous way to significantly reduce the width dimensions in the transport position.

In a further advantageous embodiment, the cutterbar of the mowing machine can be supplemented at both ends of the cutterbar with an additional lateral cutterbar section 4 so that in this way a significantly greater width modification of the mowing machine between the working position and the transport position can be realized.

FIGS. 1 and 2 show furthermore that the joint and drive assembly 5 is comprised of two holding elements 6, 7 which are each connected with one end to the cutterbar 2 or the at least one additional lateral cutterbar section 4 while at the other end of the holding elements 6, 7 a joint location 8 is formed. This joint location 8 is designed such that the holding elements 6, 7 are pivotable relative to each other in planes that are positioned at a small spacing one above the other. A small spacing is to be understood in the context of the invention such that it is dimensioned just so that a mutual contact of the holding elements 6, 7 is just prevented when pivoting the holding elements 6, 7 relative to each other.

A first embodiment of a joint and drive assembly 5 is illustrated in FIGS. 1 and 2. In this context, in the ground-near plane of the cutterbar 2 a housing section 9 is provided which is connected directly to the cutterbar 2 and extends all the way to the joint location 8. In order for a pivot movement of the holding elements 6, 7 to be enabled, the holding element 7 must have a height displacement which is produced in that a housing section 10 connected to the at least one additional lateral cutterbar section 4 is connected to a spur gear unit 11 which also extends all the way to the joint location 8. The housing sections 9, 10 form in this context together with the cutterbar 2 or with the at least one additional lateral cutterbar section 4, respectively, a gear housing which is oil-tightly sealed.

Figure 3:
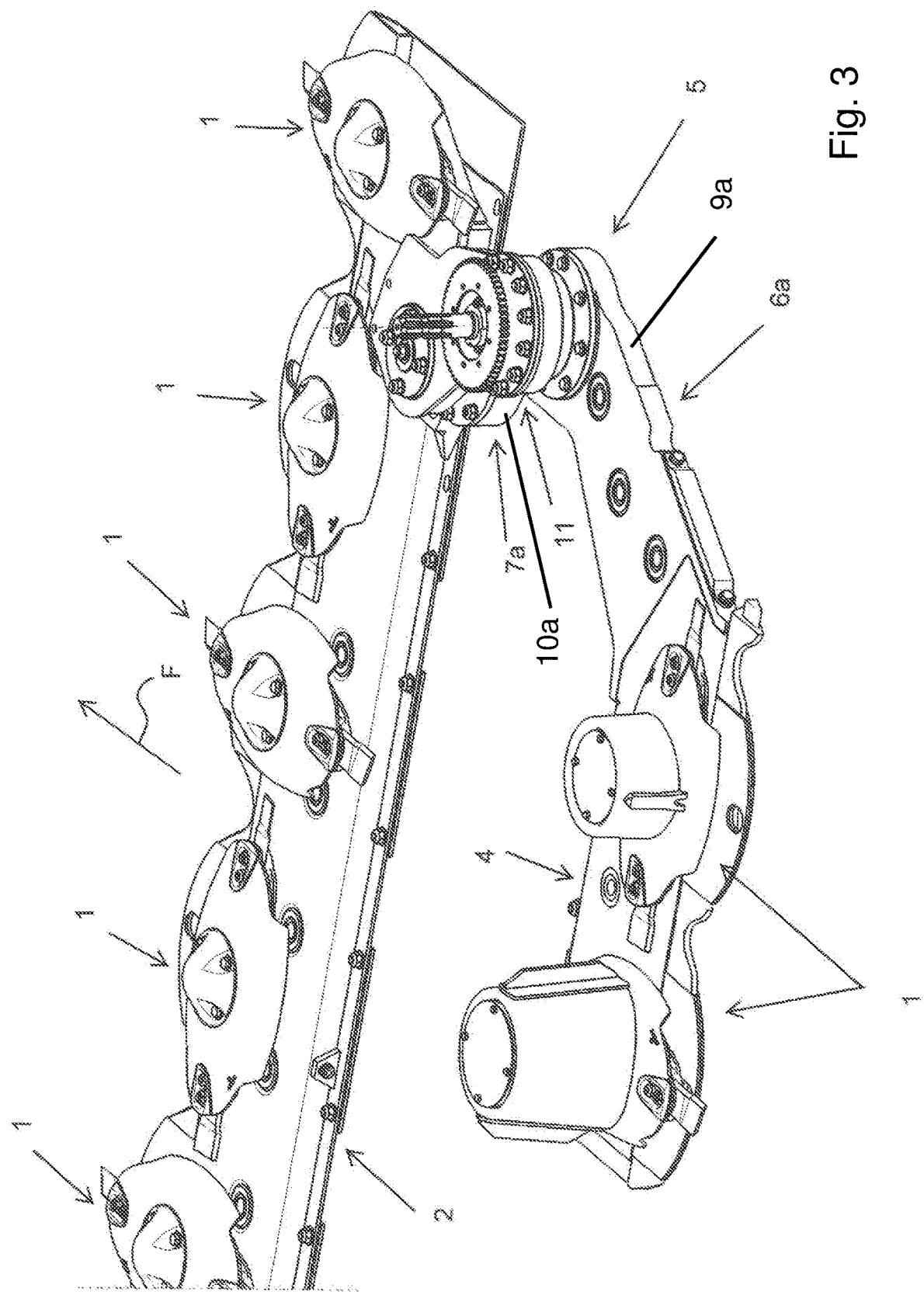
FIG. 3 shows a perspective illustration of a further embodiment of the mowing machine according to the invention in the transport position.

FIG. 3 discloses a further conceivable embodiment of the joint and drive assembly 5 with its holding elements 6a, 7a. Here, a housing section 9a is connected in a ground-near plane to the at least one additional lateral cutterbar section 4 and extends all the way to the joint location 8. Also in analogy to the embodiment according to FIGS. 1 and 2, the holding element 7a also has a height displacement that is produced in that a housing section 10a which adjoins the cutterbar 2 is connected in a plane above the cutterbar 2 to the spur gear unit 11.

Figure 4:
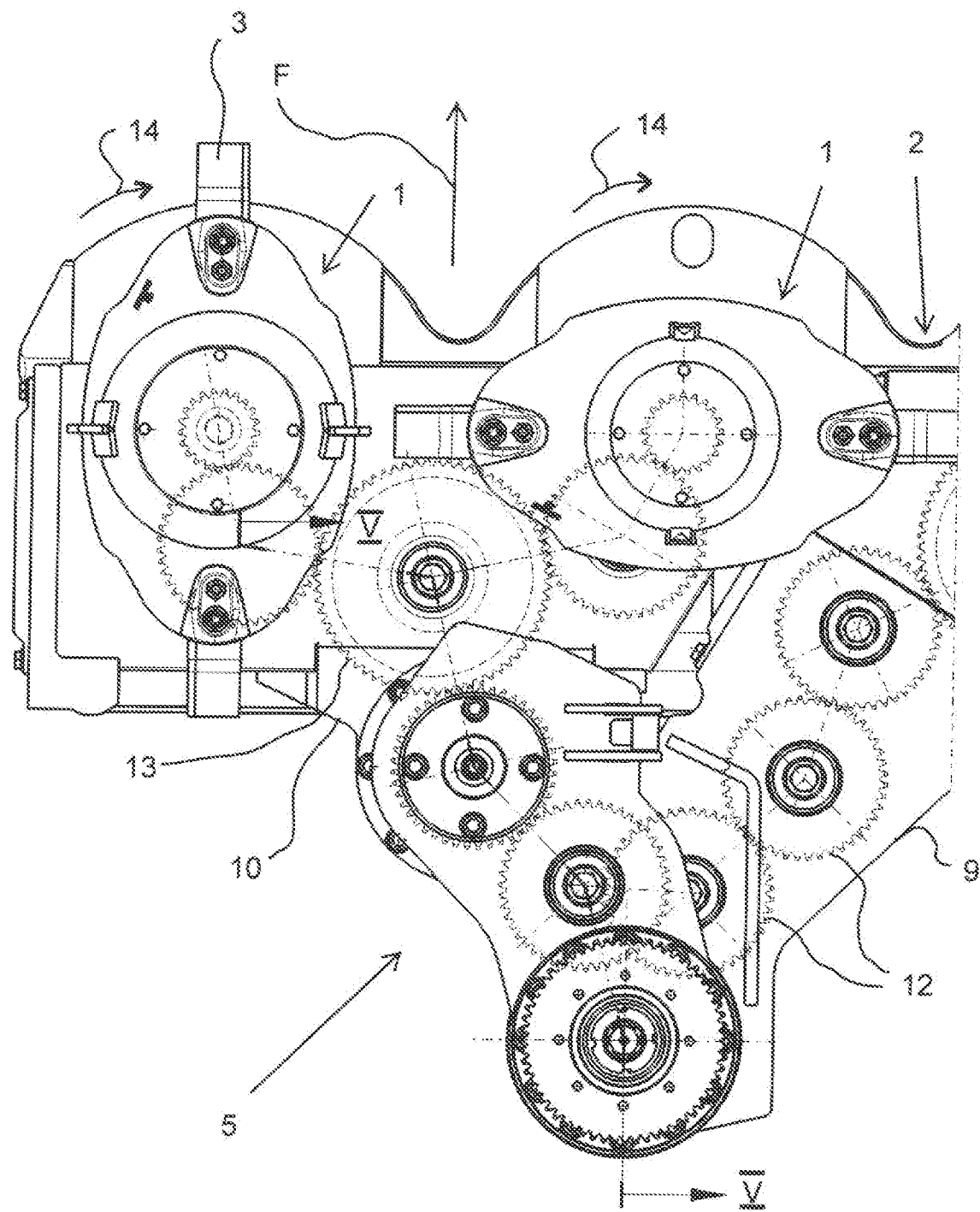
FIG. 4 shows a partially broken away view of the mowing machine according to FIG. 1 from above.

In FIG. 4, the type of drive connection between the cutterbar 2 and the at least one additional lateral cutterbar section 4 is illustrated in detail in a view from above onto the joint and drive assembly 5. It can be seen clearly that the drive connection between the cutterbar 2 and the at least one additional lateral cutterbar section 4 is formed of a series of spur gears 12, 13 adjoining each other and accommodated in the interior of the housing sections 9, 10. The number of spur gears 12, 13 which are employed in this drive connection depends on how far behind the cutterbar 2 the at least one additional lateral cutterbar section 4 is to be positioned in the transport position (FIGS. 2 and 3). A further criterion in selecting the number of spur gears in the drive connection of the joint and drive assembly 5 is the determination of the rotational direction 14 of the outer cutting member(s) 1. When the rotational direction of the outer cutting member(s) 1 is to be oriented toward the center of the mowing machine and the outer cutting member 1 of the cutterbar 2 is to rotate outwardly, it is necessary that the drive connection has an even number of spur gears 12, 13. When however the rotational direction of the outer cutting member 1 of the cutterbar 2 is to be inwardly directed, an uneven number of spur gears 12, 13 is to be selected.

Figure 5:
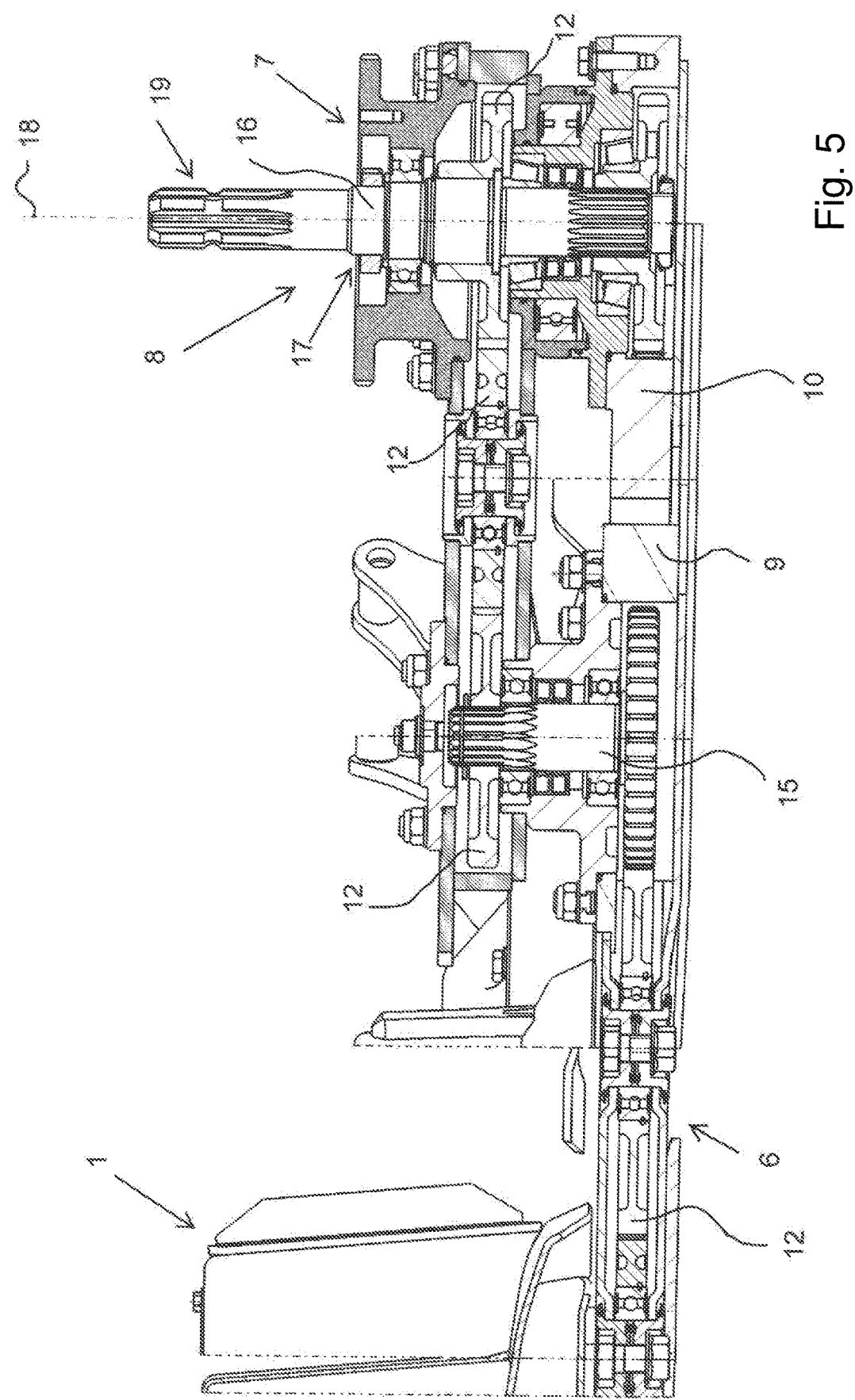
FIG. 5 is a partially broken away section illustration of the mowing machine according to the section v-v of FIG. 4.

FIG. 5 shows in a detailed section illustration the configuration of the joint location 8 of the joint and drive assembly 5. Beginning at the housing section 9 of the holding element 6, a spur gear 12 is illustrated in detail as it is rotatably supported in the housing section 9. In this way, in the housing section 9 a kinematic chain is formed which extends between the outer cutting member 1 of the cutterbar 2 and the joint location 8 of the joint and drive assembly 5. In the further course of the drive connection between the outer cutting member 1 of the cutterbar 2 and the joint location 8, a spur gear shaft 15 is arranged that serves to introduce the drive movement into a plane above the plane of the cutterbar 2. The spur gear unit 11 contains also a plurality of spur gears 12 which extend to a drive shaft 16 of the joint location 8. This drive shaft 16 here provides two advantageous properties of the joint and drive assembly 5. Firstly, the drive shaft 16 ensures that the drive movement of the spur gears 12 of the spur gear unit 11 is again transmitted from the upper plane into the plane of the at least one additional lateral cutterbar section. Secondly, the drive shaft 16 also forms the joint axis 17 of the joint location 8 so that a pivot movement of the holding elements 6, 7 of the joint and drive assembly 5 about the approximately vertically oriented pivot axis 18 is enabled. For ensuring a reliable lubrication, the spur gear unit 11 as well as the housing sections 9, 9a, 10, 10a connected to the cutterbar 2 and the at least one additional lateral cutterbar section 4 are oil-tightly sealed relative to each other.

Moreover, FIG. 5 shows an advantageous further embodiment of the invention. Due to the configuration of the drive shaft 16 with a power take-off profile 19, the drive shaft 16 can also be used to introduce the entire drive output for the cutting members 1 of the cutterbar 2 and the at least one additional lateral cutterbar section at the joint location 8 by means of the power take-off profile 19. This ensures in an advantageous way that drive parts will never come into contact with mowed stem and leaf material.

Figure 6:
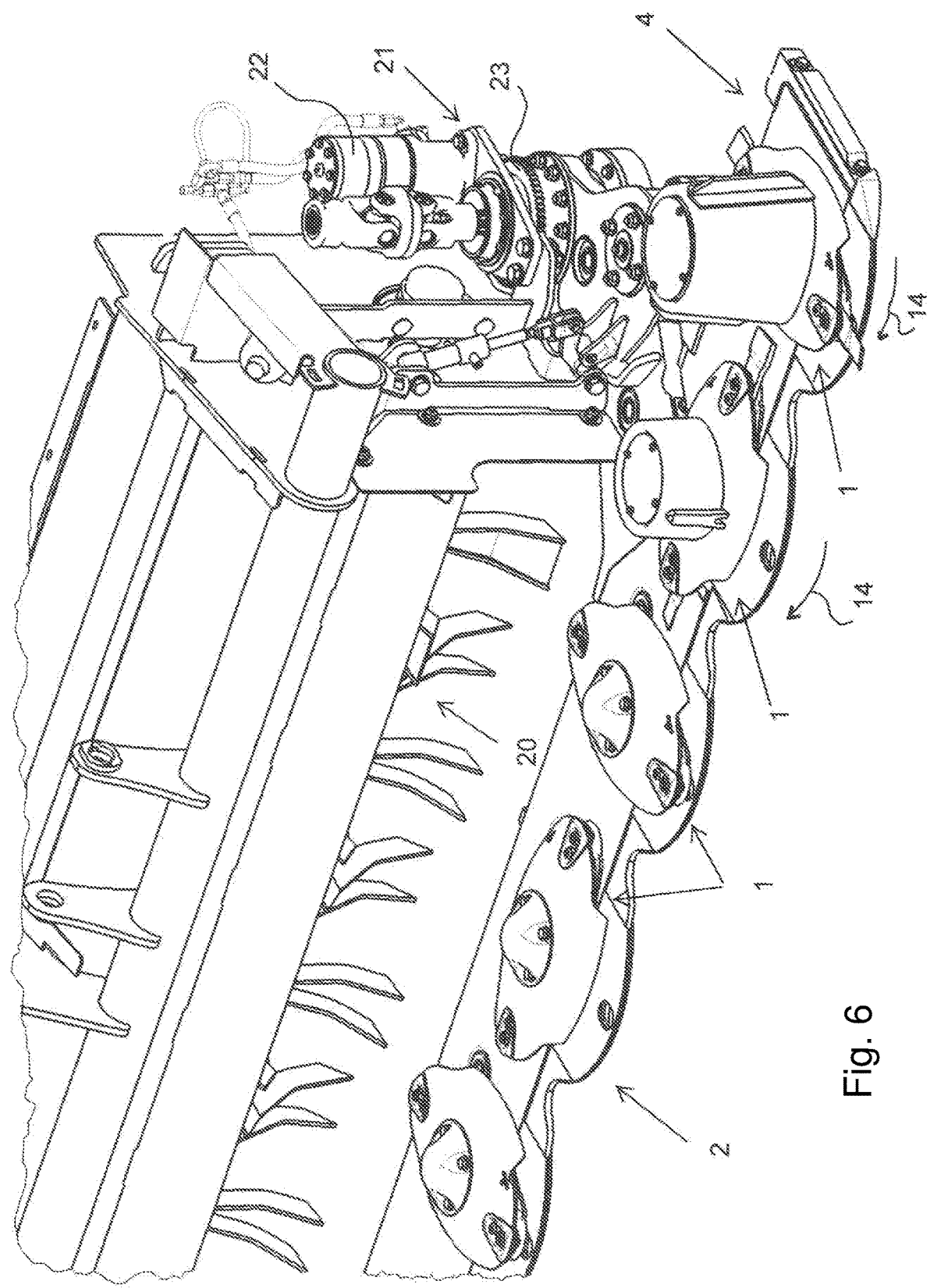
FIG. 6 is a perspective illustration of a mowing machine according to the invention in the working position with attached processing unit.

A mowing machine which is provided with an attached processing unit 20 is illustrated in FIG. 6 in detail. This illustration makes clear that the at least one additional lateral cutterbar section 4 is designed such that the two cutting members 1 of the at least one additional lateral cutterbar section 4 due to the inwardly oriented rotational direction 14 transport the mowed stem and leaf material of the additional working width into the processing unit 20. When also looking at FIGS. 2 and 3 in combination with FIG. 6, it is also clear that by transferring the at least one additional lateral cutterbar section 4 into the transport position an advantageous adaptation of the width dimensions of the mowing machine is realized. Transferring the at least one additional lateral cutterbar section 4 into the transport position, can be initiated in a further advantageous embodiment by an actuating device 21 which is comprised of a hydraulic drive motor 22 and engages a ring gear 23.

The specification incorporates by reference the entire disclosure of German priority document 10 2019 002 828.7 having a filing date of Apr. 18, 2019.

While specific embodiments of the invention have been shown and described in detail to illustrate the inventive principles, it will be understood that the invention may be embodied otherwise without departing from such principles.

What is claimed is:

1. A mowing machine comprising:
   a cutterbar having a longitudinal extension oriented transverse to a travel and working direction of the mowing machine, the cutterbar comprising a first end and a second end spaced apart from each other in a direction of the longitudinal extension;

first cutting members rotatably mounted and supported on a top side of the cutterbar and configured to be rotatably driven about an approximately vertical axis, respectively, by a drive assembly accommodated within the cutterbar;

a joint and drive assembly connected to the first end of the cutterbar;

a lateral cutterbar section connected to the joint and drive assembly and comprising a second cutting member configured to be driven by the joint and drive assembly;

wherein the joint and drive assembly is comprised of a first holding element connected to the cutterbar and a second holding element connected to the lateral cutterbar section, wherein the first holding element has a first end facing away from the cutterbar and the second holding element has a second end facing away from the lateral cutterbar section, wherein the first and second holding elements are connected to each other at the first and second ends thereof and configured to pivot relative to each other in a cutterbar plane of the cutterbar such that the lateral cutterbar section carries out a pivot movement in the cutterbar plane of the cutterbar when the first and second holding elements pivot relative to each other;

wherein the first holding element is arranged in a first plane and the second holding element is arranged in a second plane, wherein the first and second planes are positioned at a minimal spacing above each other.

2. The mowing machine according to claim 1, wherein the lateral cutterbar section in a working position thereof is aligned with the cutterbar.

3. The mowing machine according to claim 1, wherein the first cutting members of the cutterbar include outer cutting members arranged at the first end of the cutterbar, wherein the lateral cutterbar section in a transport position is arranged at least approximately behind the outer cutting members of the cutterbar, viewed in the travel and working direction.

4. The mowing machine according to claim 1, wherein the first and second ends of the first and second holding elements are pivotably connected to each other at a joint location of the joint and drive assembly, wherein the joint location comprises an at least approximately vertically oriented pivot axis.

5. The mowing machine according to claim 4, wherein the first holding element and the cutterbar form together an oil-tightly sealed gear housing.

6. The mowing machine according to claim 4, wherein the second holding element comprises a spur gear unit arranged above the lateral cutterbar section and stationarily connected to the lateral cutterbar section.

7. The mowing machine according to claim 6, wherein the spur gear unit comprises an approximately vertically oriented spur gear shaft and is configured to transmit a drive output to the lateral cutterbar section, wherein the spur gear unit is oil-tightly sealed relative to the lateral cutterbar section.

8. The mowing machine according to claim 4, wherein the second holding element and the lateral cutterbar section form together an oil-tightly sealed gear housing.

9. The mowing machine according to claim 1, wherein the first holding element comprises a spur gear unit arranged above the cutterbar and stationarily connected to the cutterbar.

10. The mowing machine according to claim 9, wherein the spur gear unit comprises an approximately vertically oriented spur gear shaft and is configured to transmit a drive power to the cutterbar, wherein the spur gear unit is oil-tightly sealed relative to the cutterbar.

11. The mowing machine according to claim 1, wherein the first and second holding elements comprise spur gears arranged in an interior of the first and second holding elements, wherein the spur gears are configured to drive the second cutting member of the lateral cutterbar section by being driven by the drive assembly accommodated in the cutterbar.

12. The mowing machine according to claim 1, wherein the joint and drive assembly comprises a drive shaft that couples the first and second holding elements to each other, wherein the drive shaft is a joint axis of a joint location of the joint and drive assembly.

13. The mowing machine according to claim 12, wherein the drive shaft of the joint and drive assembly is configured to introduce a drive power for driving the first cutting members of the cutterbar and the second cutting member of the lateral cutterbar section.

14. The mowing machine according to claim 1, wherein the first and second holding elements of the joint and drive assembly are embodied as gear housings and are oil-tightly sealed relative to each other in a region of a joint location of the joint and drive assembly.

15. The mowing machine according to claim 1, further comprising an actuating device configured to transfer the lateral cutterbar section from a working position into a transport position and from the transport position into the working position.

\* \* \* \* \*